Figure 1:
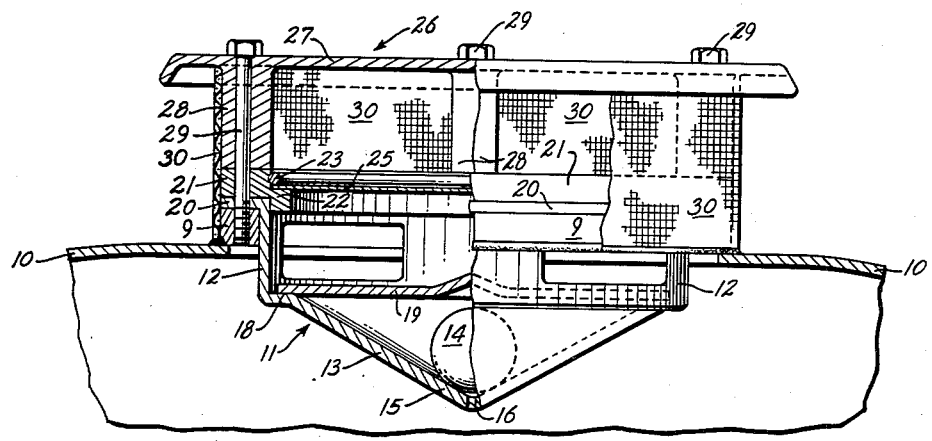

March 3, 1964

R. D. MARX 3,123,087

VACUUM OR PRESSURE RELIEF SAFETY VALVE FOR TANKS

Filed June 16, 1961

INVENTOR.
ROBERT D. MARX

BY
Morgan, Finnegan, Durham & Pine

ATTORNEYS

United States Patent Office 3,123,087
Patented Mar. 3, 1964

3,123,087
VACUUM OR PRESSURE RELIEF SAFETY
VALVE FOR TANKS
Robert D. Marx, 952 Meeker Ave., Valley Stream, N.Y.
Filed June 16, 1961, Ser. No. 117,650
16 Claims. (Cl. 137—43)

This invention relates to safety valves and more particularly to safety valves for preventing spillage, rupture, contamination and fire in truck tanks and the like.

Objects of the invention include the provision of a safety mechanism for truck tanks and the like which deals effectively with a number of hazards associated therewith including excessive pressure or vacuum, roll over and contamination.

A more specific object of the invention is to provide an integral mechanism for relieving excessive pressure and vacuum in truck tanks, thus preventing an explosive or implosive destruction of the tank body and also preventing the frequently attendant fire, injury or loss of life and great property damage.

A further object of the invention is to provide an integral safety mechanism for relieving excessive pressure and vacuum in truck tanks while preventing conjointly, the spillage of tank contents should the tank roll over or tilt excessively.

A still further object of the invention is to provide such a safety mechanism which prevents contamination of the tank contents, inhibits the start of fires and is simply reconditioned after the pressure-vacuum relief means has operated.

These and other objects and advantages of the invention will be set forth in part hereinafter and in part will be obvious herefrom, or may be learned by practice with the invention, the same being realized and attained by means of the instrumentalities and combinations pointed out in the appended claims.

Briefly and generally, the invention comprises a safety valve adapted to be secured to a tank containing a fluid product, the valve including means for defining a port, main closure means comprising a relief disk positioned over the port and secured in closing relationship therewith, auxiliarly closure means in the form of a roll-over disk, and a ball actuator confined in an inclined plane structure adjacent the roll-over disk, and substantially isolated from the tank interior, the actuator being adapted to impel the roll-over disk into closing relationship with respect to the port when the tank tilts unduly. The relief disk acts to seal the tank except when internal pressure or vacuum becomes excessive at which time the seal is ruptured. The roll-over disk is so arranged within the valve that when the tank tilts unduly and is actuated by the ball-inclined plane arrangement as aforesaid, the weight of the product complements the actuator and acts to maintain the roll-over disk in the closed position. Guide means for controlling the movement of both disks and for providing the necessary communicating passageways with the tank interior and exterior cooperate with the above-described structures while the roll-over disk is specially contoured to prevent interference with the pressure and vacuum relief functions.

The invention consists in the novel parts, constructions, arrangements, combinations and improvements herein shown and described.

Figure 2:
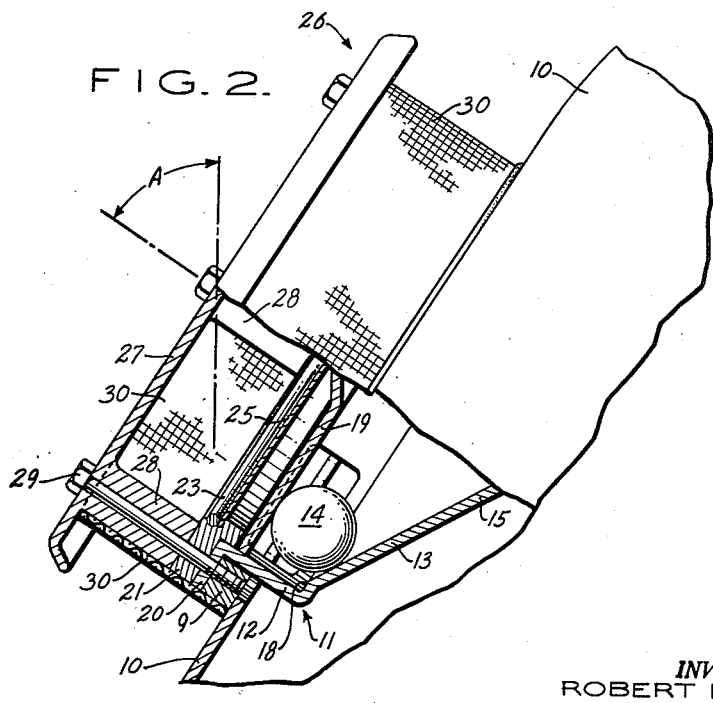

Serving as an illustration of the exemplary embodiment of the invention are the drawings, of which:

FIGURE 1 is an elevation view partly in section of a valve according to the invention installed on a tank body; and FIGURE 2 is a drawing of the valve partially in section and partially in schematic form illustrating the relationship of parts when the tank has been tipped (in any plane) through a predetermined angle.

In FIGURE 1 the valve according to the invention is shown as comprising an annular base 9 which is secured to the tank body 10 over an opening therein by any suitable means such as welding. Cooperating with the base 9 is a lower vent assembly 11 comprising an upper cylindrical cage section 12 and integral therewith a ball chamber 13 of generally conical shape. Disposed in chamber 13 is a ball 14, preferably of Monel or bronze, which is carried in the pocket formed by the apex section 15 of the chamber 13. A vertically oriented drain hole is provided at the apex for draining off any tank product which accumulates therein. The lower vent assembly 11 comprising the aforementioned cage and ball chamber is seated in the annular base 9 with a part of the cage and the entire chamber being hung below base 9 and within tank 10. At the junction of the chamber and cage there is provided a horizontal seat 18 which is formed as a result of the reduced diameter of the junction. Horizontally disposed on the seat 18 is a roll-over disk 19 which is free to move vertically within the confines of the guiding cage structure under circumstances more fully described hereinafter. The disk is oriented relative to the cage structure 12 such that the upper surface is exposed to any fluid which may be passing through the apertures in the cage structure and into the upper area of the valve. The sides and lower surface of the disk are substantially isolated from the product and other fluids by the lower section of the cage and by the ball chamber which is imperforate on its sides except for drain hole 16. Certain of the above structure and more described hereinafter is disclosed in applicant's copending application, Serial No. 29,454, filed May 16, 1960, for Venting Arrangement, now Patent No. 3,084,704.

Seated above the flange 20 of the lower vent assembly 11 is an annular ring 21, the inner periphery of which serves to define a port. The outer diameter of the ring 21 conforms substantially with the outer diameter of flange 20 and base plate 9 so that the exterior of the entire assembly presents a smooth cylindrical surface. The inner diameter of ring 21 is smaller than the inner diameter of cage 12 and includes a step 22. Seated on the port in step 22 is the relief disk 25 which closes the port and is secured thereto by a lock ring 23 which engages the disk and fits in a recess on the wall of the step. In the presence of excessive differential pressure, e.g., excessive internal pressure or vacuum, the disk is distorted and becomes unseated to thereby provide venting action. Illustratively, the disk is distorted into a partially conical shape with folds therein so that a part of the disk periphery becomes unseated from step 22 and ring 23. In view of the large apertures in cage 12 as well as the large size of disk 25 (and the port)—in a preferred embodiment the disk is over 5 inches in diameter—large venting capacity is then provided, the vented fluid passing through the open areas of cage 12, through the port and thence to the atmosphere via a hat assembly 26. In the case of vacuum relief the atmosphere gains access to the tank interior via the above-described route. It should also be observed that the curved central section of roll-over disk 19 tends to keep that disk in its normal position during venting, thus preventing obstruction. The point at which pressure or vacuum relief occurs is controlled by selecting an appropriate gauge of disk 25.

The hat assembly 26 comprises horizontal cover 27 disposed in spaced and parallel relationship above the disk 25 by means of posts 28 periodically spaced around the periphery of the disk and aligned with the base 9, flange 20 and annular ring 21. The cover 27 overhangs the lower portions of the valve and provides protection against moisture, foreign matter and the like.

Installed vertically in each post 28 is securing means such as a machine screw 29 which passes through holes in the respective post, thence through ring 21 and flange 20 and is tapped into a threaded bore in base 9. These screws accordingly act to secure the hat 26, annular ring 21, lower vent assembly 11 and base 9.

Serving to minimize explosions during a fire and also functioning as a protective device is a screen 30 which circumscribes the sides of the overall valve assembly.

The operation of the valve in the event of roll-over is illustrated in FIGURE 2 where the valve is shown tilted through angle A. In such an event ball 14 rolls out of its pocket 15, contacts roll-over disk 19 and urges the same into closing relationship with respect to the port defined by ring 21. The contents of the tank also act against disk 19, tending to hold it in the closed position.

The invention in its broader aspects is not limited to the specific mechanism shown and described but departures may be made therefrom within the scope of the accompanying claims without departing from the principles of the invention and without sacrificing its chief advantages.

What is claimed is:

1. A safety valve for truck tanks and the like, said valve providing automatic differential pressure relief as well as roll over and fire protection, comprising port means, non-frangible and distortable port closure means, said closure means being normally secured in closing relationship with respect to said port means and distortable in the presence of excessive differential pressure to thereby open said port means and provide relief, angle responsive closure means including means responsive to the orientation of said valve relative to the gravity vector, said angle responsive closure means being operable to close said port means when said value is angularly displaced from said gravity vector.

2. A safety valve according to claim 1 in which said angle responsive closure means is on the opposite side of said port means from said distortable closure means.

3. A safety valve according to claim 1 in which said orientation responsive means is substantially enclosed during normal orientation of said valve.

4. A safety valve according to claim 1 in which said distortable closure means comprises a member which seals said port except when said member is dimensionally distorted in the presence of an excessive pressure differential.

5. A safety valve according to claim 1 in which said distortable closure means is clamped to said port means.

6. A safety valve according to claim 1 in which said distortable closure means covers said port means except when said distortable means is warped in the presence of excessive pressure.

7. A safety valve according to claim 1 in which said angle responsive closure means includes a closure member normally biased inertially into an unobstructed position with respect to said port means.

8. A safety valve for a truck tank and the like, said valve providing automatic differential pressure relief as well as roll over and fire protection, comprising port defining means, a non-frangible disk, means connecting said disk to said port defining means to close said port, said disk being dimensionally distortable in the presence of an excessive pressure differential such that said port opens when said distortion occurs, roll over closure means for said port defining means, gravity direction sensing means disposed relative to said roll over closure means to cause said roll over closure means to move into closing position with respect to said port defining means when the direction of gravity relative to said valve changes by an excessive amount.

9. A safety valve according to claim 8 in which said disk is clamped by said connecting means to an upper section of said port defining means while said roll over closure means depends from a lower section of said port defining means.

10. A safety valve according to claim 8 in which said gravity direction sensing means is substantially enclosed in the normal position of said valve.

11. A safety valve according to claim 8 including passageways communicating with said port and adapted to communicate with the interior of said tank, said passageways being partially bounded by said roll over closure means.

12. A safety valve according to claim 8 in which said connecting means comprise a snap ring.

13. A safety valve according to claim 8 in which said roll over closure means comprise a roll over disk adapted to respond to the weight of the contents of said tank when said tank is angularly displaced a predetermined amount.

14. A safety valve for a truck tank and the like, said valve providing pressure and vacuum relief as well as roll over and fire protection, comprising a port structure, a non-frangible disk clamped to said structure in closing relationship therewith, said disk being normally larger than said port and adapted to be dimensionally distorted when pressure on the lower or upper surface thereof exceeds an amount related to the thickness of said disk whereby said port is opened to thereby provide venting action for pressure and vacuum relief, a guide structure suspended below said port and including a seat, a rollover disk positioned on said seat, a generally conical enclosure suspended below said seat and including a ball normally carried in the apex region of said conical member, the sloping surface of said conical member being adapted to guide said ball into contact with said rollover disk in a manner such that the latter moves into proximity with said port to close the same in the event said tank tilts through an excessive angle.

15. A safety valve according to claim 14 including a compressible ring said disk being clamped to said port structure by said ring.

16. A safety valve according to claim 14 including a cover assembly positioned above said port structure and a screen mounted in the annular space between said port structure and said cover assembly.

References Cited in the file of this patent

UNITED STATES PATENTS

| | | |
|---|---|---|
| 593,109 | Lear | Nov. 2, 1897 |
| 1,724,878 | Jensen | Aug. 13, 1929 |
| 2,747,594 | Boetjer | May 29, 1956 |

FOREIGN PATENTS

| | | |
|---|---|---|
| 908,989 | France | Nov. 12, 1945 |